United States Patent
Allen et al.

(10) Patent No.: US 9,908,051 B2
(45) Date of Patent: Mar. 6, 2018

(54) TECHNIQUES FOR CREATING DYNAMIC GAME ACTIVITIES FOR GAMES

(71) Applicant: INTERNATIONAL BUSINESS MACHINES CORPORATION, Armonk, NY (US)

(72) Inventors: Corville O. Allen, Durham, NC (US); Andrew R. Freed, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 14/531,677

(22) Filed: Nov. 3, 2014

(65) Prior Publication Data

US 2016/0121218 A1    May 5, 2016

(51) Int. Cl.
   G06F 17/00     (2006.01)
   A63F 13/67     (2014.01)
   A63F 13/65     (2014.01)
   A63F 13/822    (2014.01)

(52) U.S. Cl.
   CPC .............. *A63F 13/67* (2014.09); *A63F 13/65* (2014.09); *A63F 13/822* (2014.09)

(58) Field of Classification Search
   None
   See application file for complete search history.

(56) References Cited

U.S. PATENT DOCUMENTS

| | | | |
|---|---|---|---|
| 6,418,440 B1 | 7/2002 | Kuo et al. | |
| 7,577,642 B2 | 8/2009 | Liu et al. | |
| 7,627,536 B2 | 12/2009 | Kacmarcik | |
| 8,156,060 B2 | 4/2012 | Borzestowski et al. | |
| 8,484,015 B1 | 7/2013 | Wolfram et al. | |
| 2004/0059719 A1 | 3/2004 | Gupta et al. | |
| 2004/0128618 A1 | 7/2004 | Datta | |
| 2006/0206310 A1 | 9/2006 | Ravikumar et al. | |
| 2007/0288404 A1* | 12/2007 | Kacmarcik | G06F 17/2881 706/11 |
| 2009/0305774 A1* | 12/2009 | Farone | A63F 13/12 463/25 |
| 2011/0258049 A1 | 10/2011 | Ramer et al. | |
| 2011/0320446 A1 | 12/2011 | Chakrabarti et al. | |
| 2013/0018652 A1 | 1/2013 | Ferrucci et al. | |

(Continued)

OTHER PUBLICATIONS

Dominguez-Sal, David et al., "Cache-aware Load Balancing for Questions Answering", Proceedings of the 17th ACM Conference on Information and Knowledge Management, CIKM 2008, Napa Valley, California, USA, Oct. 26-30, 2008.

(Continued)

*Primary Examiner* — Lawrence Galka
(74) *Attorney, Agent, or Firm* — Michael R. Long; Diana L. Roberts

(57) ABSTRACT

A technique for dynamically generating game activities for a game (e.g., a role-playing game) includes loading game information about the game into a data processing system (e.g., a question answering system). Context data (e.g., a question) is received from a client (e.g., a player of the game, a user of the game, another system, or a game engine). In response to receiving the context data, a game activity is dynamically generated based on the context data and the game information. The game activity is then initiated in the game and presented to the client.

8 Claims, 6 Drawing Sheets

(56) References Cited

U.S. PATENT DOCUMENTS

| | | | |
|---|---|---|---|
| 2013/0288757 A1* | 10/2013 | Guthridge | A63F 13/12 463/2 |
| 2013/0346068 A1 | 12/2013 | Solem et al. | |
| 2014/0006012 A1 | 1/2014 | Zhou et al. | |

OTHER PUBLICATIONS

Dominguez-Sal, David et al., "A Multi-layer Collaborative Cache for Question Answering", Euro-Par 2007 Parallel Processing, Aug. 28-31, 2007, pp. 295-306.

Steven Garcia, "Search Engine Optimisation Using Past Queries", Ph.D. Thesis, RMIT University, Melbourne, Victoria, Australia, Mar. 30, 2007.

Corville O. Allen, "Techniques for Managing Data in a Cache Memory of a Question Answering System", U.S. Appl. No. 14/508,678, filed Oct. 7, 2014, Non-Final Office Action dated Feb. 24, 2017.

Corville O. Allen, "Techniques for Managing Data in a Cache Memory of a Question Answering System", U.S. Appl. No. 14/508,678, filed Oct. 7, 2014, Final Office Action dated Sep. 8, 2017.

Corville O. Allen, "Techniques for Managing Data in a Cache Memory of a Question Answering System", U.S. Appl. No. 15/079,925, filed Mar. 24, 2016, Non-Final Office Action dated Mar. 1, 2017.

Corville O. Allen, "Techniques for Managing Data in a Cache Memory of a Question Answering System", U.S. Appl. No. 15/079,925, filed Mar. 24, 2016, Final Office Action dated Nov. 16, 2017.

Corville O. Allen, "Creating Dynamic Game Activities for Games", U.S. Appl. No. 15/081,857, filed Mar. 26, 2016, Non-Final Office Action dated Jun. 2, 2017.

Corville O. Allen, "Creating Dynamic Game Activities for Games", U.S. Appl. No. 15/081,857, filed Mar. 26, 2016, Notice of Allowance dated Oct. 25, 2017.

* cited by examiner

TECHNIQUES FOR CREATING DYNAMIC GAME ACTIVITIES FOR GAMES

BACKGROUND

The present disclosure is generally directed to games and, more specifically, to techniques for creating dynamic game activities for games, such as role-playing games, using a data processing system, such as a cognitive system or a question answering system.

Watson is a question answering (QA) system (i.e., a data processing system) that applies advanced natural language processing, information retrieval, knowledge representation, automated reasoning, and machine learning technologies to the field of open domain question answering. In general, document search technology receives a keyword query and returns a list of documents, ranked in order of relevance to the query (often based on popularity and page ranking). In contrast, QA technology receives a question expressed in natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of one million books, per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn. While cognitive systems have deep domain expertise, instead of replacing human experts, cognitive systems act as a decision support system to help human experts make better decisions based on the best available data in various areas (e.g., healthcare, finance, or customer service).

Massively multiplayer online role-playing games (MMORPGs) mix the genres of role-playing games and massively multiplayer online games (e.g., in the form of web browser-based video games) in which a very large number of players interact with one another within a virtual world (VW). As in all role-playing games (RPGs), a player assumes the role of a character (often in a fantasy world) and takes control over many actions of the character. MMORPGs may be distinguished from single-player or small multi-player online RPGs by the number of players and by the persistence of the VW (which is usually hosted by a game publisher and continues to exist and evolve when individual players are offline and not playing the game).

Basic characteristics of modern MMORPGs may include: a persistent game environment; some form of progressive social interaction within the game; in-game culture; system architecture; membership in a group; and character customization. The majority of popular MMORPGs are based on traditional fantasy themes, often occurring in an in-game universe (e.g., Dungeons & Dragons™). Some MMORPGs employ hybrid themes that either merge or substitute fantasy elements with those of science fiction, sorcery, or crime fiction. Still other MMORPGs draw thematic material from comic books, the occult, and other genres. Often elements of thematic material are developed using similar tasks and scenarios that involve quests, monsters, and treasure. In nearly all MMORPGs, the development of a player's character is a primary goal. Unfortunately, conventional MMORPGs are static in that game development requires further input from a game designer.

BRIEF SUMMARY

Disclosed are a method, a data processing system, and a computer program product (embodied in a computer-readable storage device) for creating dynamic game activities for games, such as role-playing games.

A technique for dynamically generating game activities for a game (e.g., a role-playing game) includes loading game information about the game into a data processing system (e.g., a question answering system). Context data (e.g., a question) is received from a client (e.g., a player of the game, a user of the game, another system, or a game engine). In response to receiving the context data, a game activity is dynamically generated based on the context data and the game information. The game activity is then initiated in the game and presented to the client.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
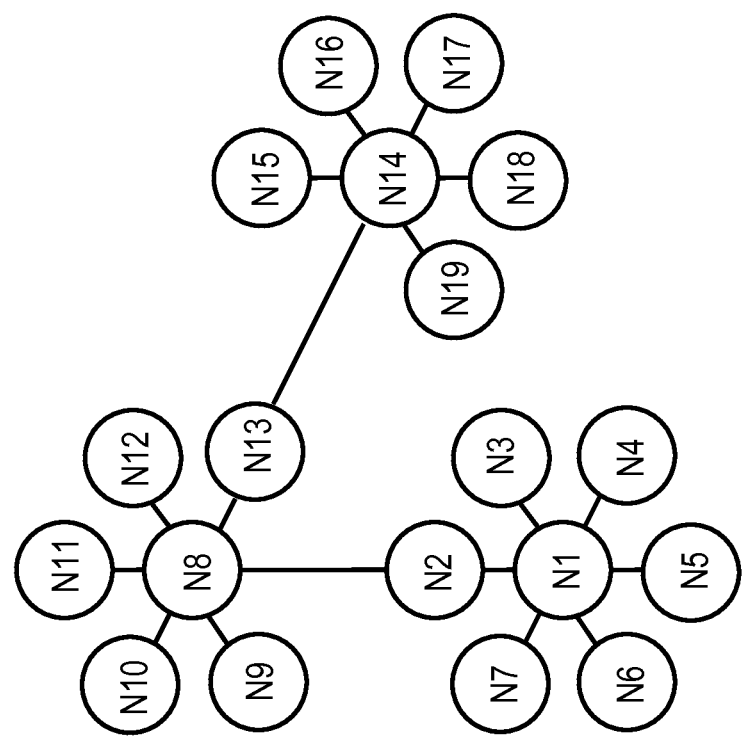
FIG. 1 is a diagram of an exemplary high performance computing (HPC) cluster that includes a number of nodes, with one or more of the nodes including multiple processors that are configured to create dynamic game activities for games (e.g., role-playing games (RPGs)), according to various aspects of the present disclosure.

The illustrative embodiments provide a method, a data processing system, and a computer program product (embodied in a computer-readable storage device) for creating dynamic content (e.g., game activities) for games, e.g., role-playing games (RPGs).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable.

Nearly all massively multiplayer online role-playing games (MMORPGs) feature a character progression system in which players earn experience points for their actions and use the experience points to reach character levels that make a character better at whatever the character does. Traditionally, combat with other characters and completing quests for non-player characters (NPCs), either alone or in groups, have been the primary ways to earn experience points in most MMORPGs. MMORPGs may also require a player to work with other players in order to progress at an optimal rate. For example, a player may need to trade items with other players to achieve certain goals or team-up with other players to kill a powerful enemy. In at least some MMORPGs, character progression is based on the accumulation of wealth (including combat-useful items) and has traditionally been accomplished via combat. The cycle of combat leading to new items that allow for more combat with no change in game play has sometimes been pejoratively referred to as 'grinding'. In some MMORPGs, there is no limit to player levels, which allows the 'grinding' experience to continue indefinitely.

In contrast, other MMORPGs set a maximum player level for all players. In MMORPGs that set a maximum player level, a definition of player progression usually changes when the maximum player level is attained. For example, instead of being rewarded primarily with experience for completing quests, collecting money and equipment may motivate a player to continue playing. Often, the equipment available at a maximum player level (i.e., endgame gear) has increased aesthetic value to distinguish high-ranking players in a game. The endgame gear may include empowered weapons and armor that adds a competitive edge to both scripted encounters, as well as player versus player combat.

MMORPGs generally provide tools to facilitate communication between players. Many MMORPGs offer support for in-game guilds or clans. Tasks that require teamwork usually require players to take on roles in a group, e.g., protecting other players from damage (referred to as 'tanking'), healing damage done to other players, or damaging enemies. In general, relationships created in MMORPG VWs are similar to those created in the physical world. Most MMORPGs provide different types of classes that players can choose. Among those classes, a small portion of players choose to role play their characters according to game rules that provide functionality and content. Guilds or similar groups with a focus on role-playing may develop extended in-depth narratives using the setting and resources of the game VW. Most MMORPGs have social rules for such things as invitations to join an adventuring party, the proper division of treasure, and how a player is expected to behave while grouped with other players.

Most MMORPGs are deployed using a client-server system architecture. The server software generates a persistent instance of the VW that runs continuously with players connecting to the server software via client software. The client software may provide access to the an entire VW or extensions may be required to be purchased to allow access to certain areas of a game. Depending on the number of players and the system architecture, an MMORPG may actually run on multiple separate servers with each separate server representing an independent VW, where players from one server cannot interact with those from another server. MMORPGs also generally have game moderators (GMs) that attempt to supervise a virtual world (VW). Some GMs may have access to features and information related to the game that are not available to other players.

Conventionally, game literature has only provided a backstory on an associated game. That is, game literature (information) has not been utilized to generate dynamic game activities to make an associated game more engaging (thus, avoiding 'grinding'). Traditionally, when a story-line of a game is changed, a game designer has been required to add/modify events associated with the changed story-line. According to aspects of the present disclosure, a game designer is not required to add/modify events as game design activities and scenarios are generated by loading game information into a data processing system (e.g., a question answering system or a cognitive system) and correlating game models to produce game activities within a game environment in real-time (e.g., during game play or at design time) responsive to received player (or designer) questions. More broadly, a question may correspond to context data and a player may correspond to a client (e.g., a game designer, a user, a player, a game moderator, another system, or a game engine). Context data may correspond to, for example, any input received from a client. In general, a game engine associated with a game may be updated to create a representation of a game activity in response to a data processing system receiving context data from a client.

According to one or more embodiments of the present disclosure, analysis and extraction of key game characteristics is performed and actions and objects are correlated with locations to produce actionable quests from natural language questions and correlated structured data associated with the questions. In this manner, game scenarios can be dynamically generated by loading game information (e.g., backstory, literature, design documents) into a data processing system and correlating game models (e.g., attributes and maps) to produce game activities (e.g., quests) within a game environment. In general, the disclosed techniques facilitate generating novel game content based on game information and context data provided by a client of a game. Disclosed techniques also facilitate dynamically generating quests to vary player experiences outside of canned quests that are initially built into a game by a game designer. More generally, the disclosed techniques facilitate mapping game literature to actionable items in a virtual environment (e.g., augmented reality, gaming environment, or virtual world (VW)) to produce actionable or informative information that is location and player context aware.

As one example, an augmented reality scenario may include a person walking down a street of New York City (NYC) playing an augmented reality game about building a business in NYC. The game context data received by a game system may correspond to the person's location and proximity to, for example, a restaurant. In this case, game information may include activities associated with investigating food prices, building a competitive menu, and establishing a feasible square footage for a restaurant competitor. A dynamically generated game activity may correspond to, for example, an observe quest and a find quest. A generated observe quest may be for a player to journey to a restaurant that is in proximity of the player and for the player to walk around with location services enabled on their mobile device to map the restaurant. A find quest may correspond to finding one item on a menu of the restaurant menu for submission. The player may then be presented with various quests that include associated activities the player performs. The activities may be tracked by the game to determine whether established goals are achieved. Goals may have corresponding rewards (e.g., points or game dollars) that are awarded to the player for achieving the goals in building a business through competition analysis in the augmented reality game.

According to at least one embodiment, natural language information associated with a game (e.g., backstory, story boards, a novel, rules, point systems, design documents, locations, and maps) is loaded into a data processing system. The natural language information provides a collection from which certain quest types may be generated. Quest types that can be generated by an evidence based probabilistic system, and player context information may then be generated. For example, quest types may include fetching, delivering, exploring, and learning. For each of the quest types, a player's current context (in game knowledge) and loaded game information may be used to generate a quest that includes a game activity, a location, and text describing an action that the player is to perform (e.g., based on player interaction with a non-player character (NPC)).

As one example, a player may interact with an NPC and (based on associated game information related to that player) the player may receive hints on key events, characters, items, and locations associated with the NPC. A player may also be provided with a game designed backstory for the player's character. The player may also free form a natural language question for the NPC about any of the key 'hints' or information in the backstory or based on the player's knowledge of game in multiple forms. For example, a natural language question may take various forms (Who is 'A'?, What is 'B'?, When is 'C'?, Where is 'D'?, Why is 'E'?, etc.).

According to various aspects, game information is loaded into a data processing system (e.g., a QA system) for processing. Locations found in the game information are annotated and associated with characters found in the game information. Importance levels for characters may be designated based on, for example, character titles (King. Lord, Governor, President, leader, etc.) and a relationship of the characters to other referenced characters. Ownership of key items and rewards may also be associated with specific characters in the game literature. Game locations that are defined, but not clearly designated by the game information, may be designated by, for example, an expert. The locations may then be associated with characters and events. Locations may, for example, be designated with acceptable ranges for character levels. According to one aspect, for each character an answer key and supporting evidence is generated for a number of question types (e.g., Who is 'character name'?, Where does 'character name' exist?, Where did 'event name' occur?, Where is 'item name'?, and Who owns 'item name'?).

In one or more embodiments, based on generated answers that have high confidence and direct or indirect supporting evidence, actionable gaming activities (e.g., in the form of quests) are generated. As examples, a quest may require: finding 'character name' in 'location' and retrieving an 'owned item'; delivering a 'current character item' to a different 'other associated character' in a 'location'; and observing a 'location'. According to various aspects of the present disclosure, when a question is received from a player, a focus and lexical answer type (LAT) of the question may be determined and compared to verify the focus and LAT match one or more categories for a quest. Sentence examples may also be generated based on the LAT. Associated game quest content may then be generated in game format for the generated sentence. For example, a quest type may include: fetching; delivering; locating, retrieving, and observing (during a particular time period). In various embodiments, the game content includes a received question text.

In one or more embodiments, a reward associated with a quest may be located in a rewards bank. Points and experience for completing a quest may be based on a location level range, quest type, and/or an NPC engaged. A reward may also be conditioned based on the quest type. For example, a reward may be conditioned on a player looting an item or items, the player reaching a designated location, and/or the player interacting with an object and/or an NPC. In various embodiments, a player is dynamically presented with a quest to accept with a location and a designated activity to perform. In the event the player accepts the quest and is able to perform one or more desired actions to complete the quest, rewards associated with the quest are awarded.

According to another aspect of the present disclosure, triggers may be published based on ambient events at a location that are randomized for each character in view of associated game information and/or location. For example, an event at a location may correspond to animal (e.g., bear)

tracks appearing at a location or a familiar smell (e.g., associated with a plant). According to one or more embodiments, ambient events are generated on a periodic basis based on game information. For example, if the game information dictates that citizens of Village 'F' live in constant fear of jackal attacks at night, jackals or attack evidence may be randomly generated when a player passes through Village 'F' at night. In this case, for a location corresponding to Village 'F', a generated activity type may correspond to 'fear' and associated objects may correspond to 'jackals'. In general, based on location, activity ontology, and associated objects, entity types in a vicinity of the location may be randomly spawned to create the activity. In a typical embodiment, population density and mobile type (i.e., an entity or character in the game) may be controlled to prevent the game environment from being overpopulated. For example, if an activity corresponds to the citizens of Village 'F' picking apples, an activity may be generated that provides the object type while randomizing locations in the vicinity of the Village 'F' to prevent a game environment from being overpopulated.

In one embodiment, a game universe (e.g., backstory, story, rules, points, locations, and maps) is loaded into a QA system. A player can then present a question to the QA system and the QA system either returns an answer (or answers) or generates a quest (or quests) based on the question. For example, a question may be "Who is 'Z'?" An answer provided by the QA system may be dependent on a player level. As one example, at level 10 the QA system may reply "I've heard he is a wizard." At level 20 the QA system may reply "I've heard he is a wizard in a dark place." At level 30 the QA system may reply "Go get a key at location 'XYZ' and then go to 'Z' in the castle." It should be appreciated that quests other than fetch and deliver may be dynamically implemented. As an example, assume a player observes some tracks on the ground at a game location, the player may ask an NPC a free-form question, such as "What are these tracks?" or if the player recognized the tracks are goblin tracks "Why are there goblin tracks here?" According to various aspects of the present disclosure, a player is not restricted to canned dialogue when providing questions to a QA system.

Conventionally, the Watson system has explored large amounts of structured and unstructured data to find candidate answers for a question (or a problem). According to various aspects of the present disclosure, techniques for performing high performance computing (HPC), or network computing, are described herein that create dynamic game activities for games, e.g., role-playing games (RPGs) and puzzles. With reference to FIG. 1, an example topology for a relevant portion of an exemplary HPC cluster (supercomputer) 100 includes a number of nodes (N1-N18) that are connected in, for example, a three-dimensional (3D) Torus topology. Each of the nodes (N1-N18) may include one or more symmetric multiprocessors (SMPs). While eighteen nodes are illustrated in FIG. 1, it should be appreciated that more or less than eighteen nodes may be present in an HPC cluster configured according to the present disclosure.

Figure 2:
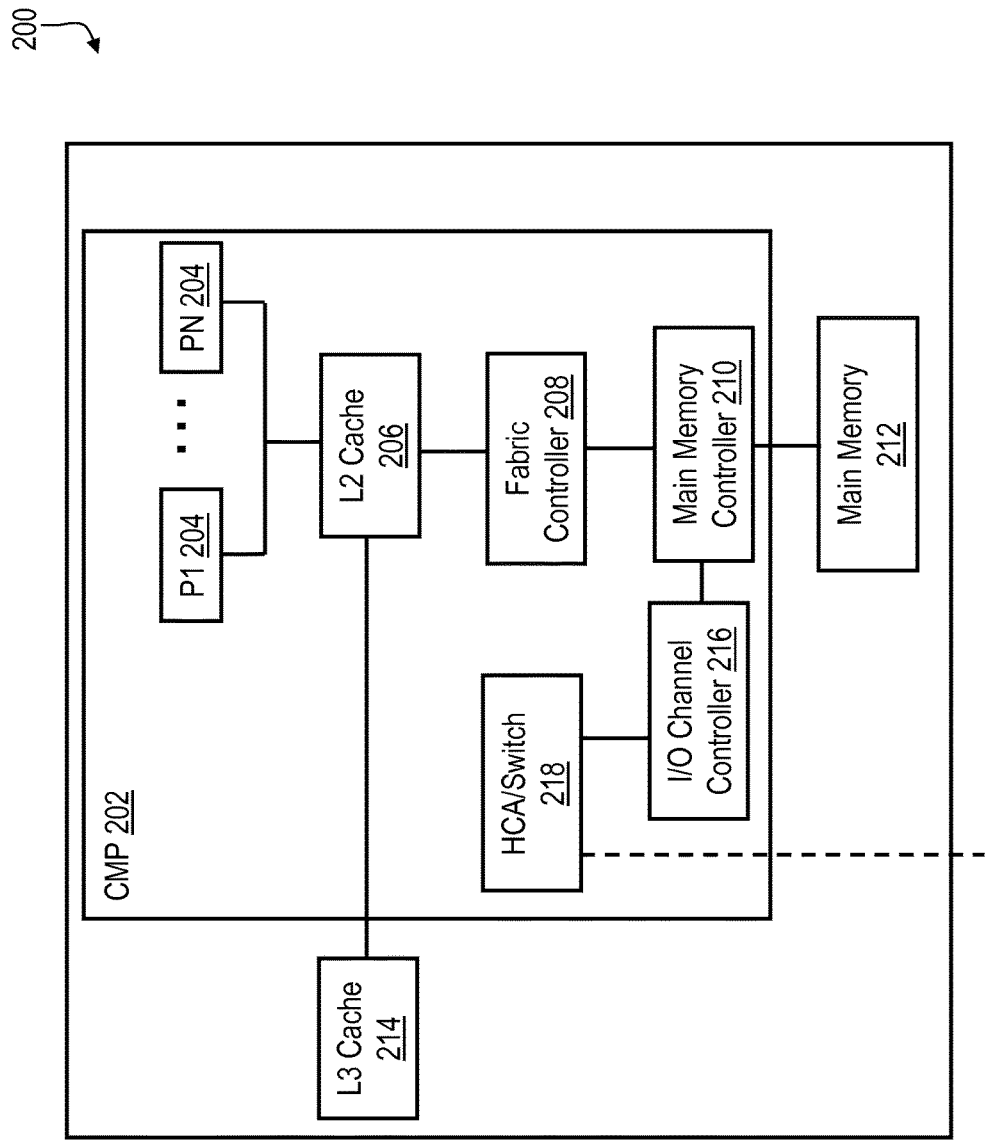
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
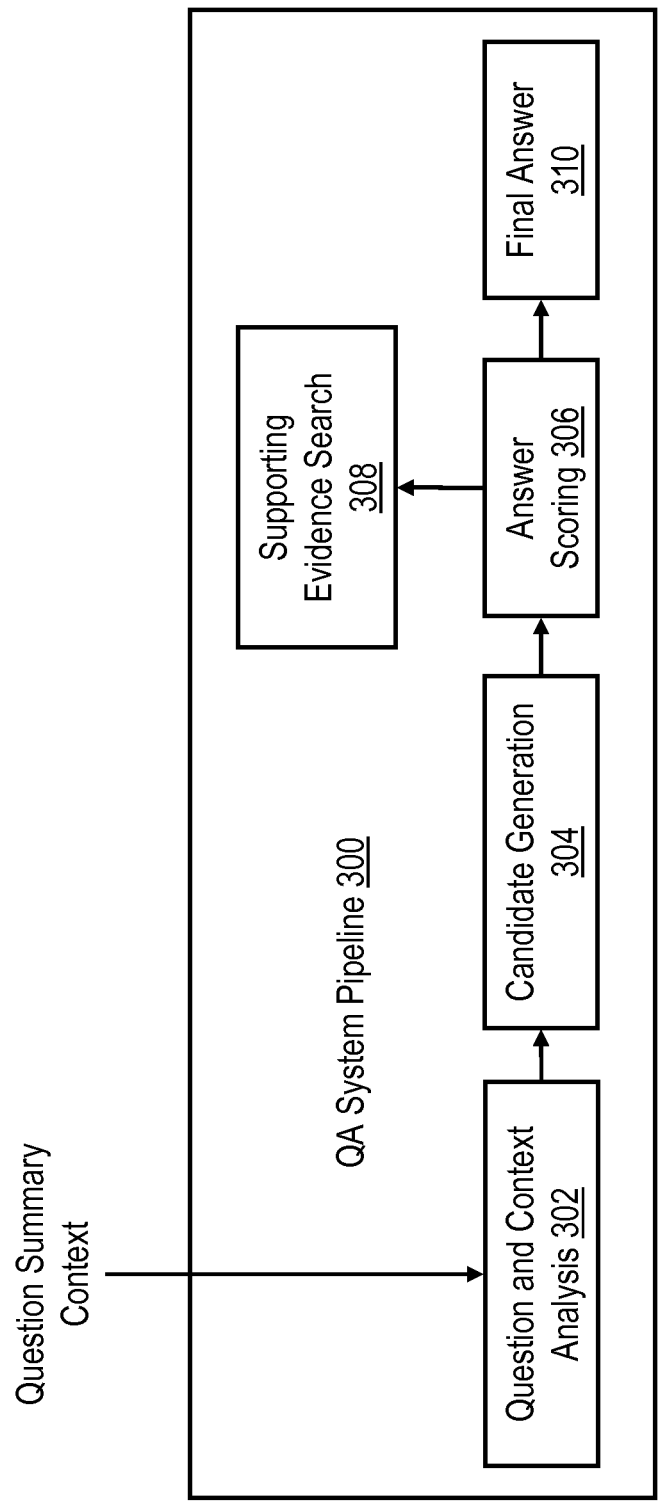
FIG. 3 depicts relevant components of an exemplary data processing system pipeline in the form of a question answering (QA) system pipeline.

FIG. 3 illustrates relevant components of a question answering system pipeline for an exemplary QA system. As is illustrated in FIG. 3, a question and context analysis block 302 of QA system pipeline 300 receives a question (e.g., in the form of a question summary context) as an input and generates an output representing its analysis of the question and the context of the question. A candidate generation block 304 of QA system pipeline 300 receives the output from question and context analysis block 302 at an input and generates candidate answers for the question. The candidate answers are provided to an input of an answer scoring block 306, which is configured to initiate a supporting evidence search (by supporting evidence search block 308) in order to score the various generated answers. The results of the answer scoring are provided to a final answer block 310, which is configured to provide a final answer to the question based on the scoring of the candidate answers. It should be appreciated that blocks 302-310 may be implemented in program code executing on one or more processor cores or may be directly implemented in dedicated hardware (logic).

Figure 4:
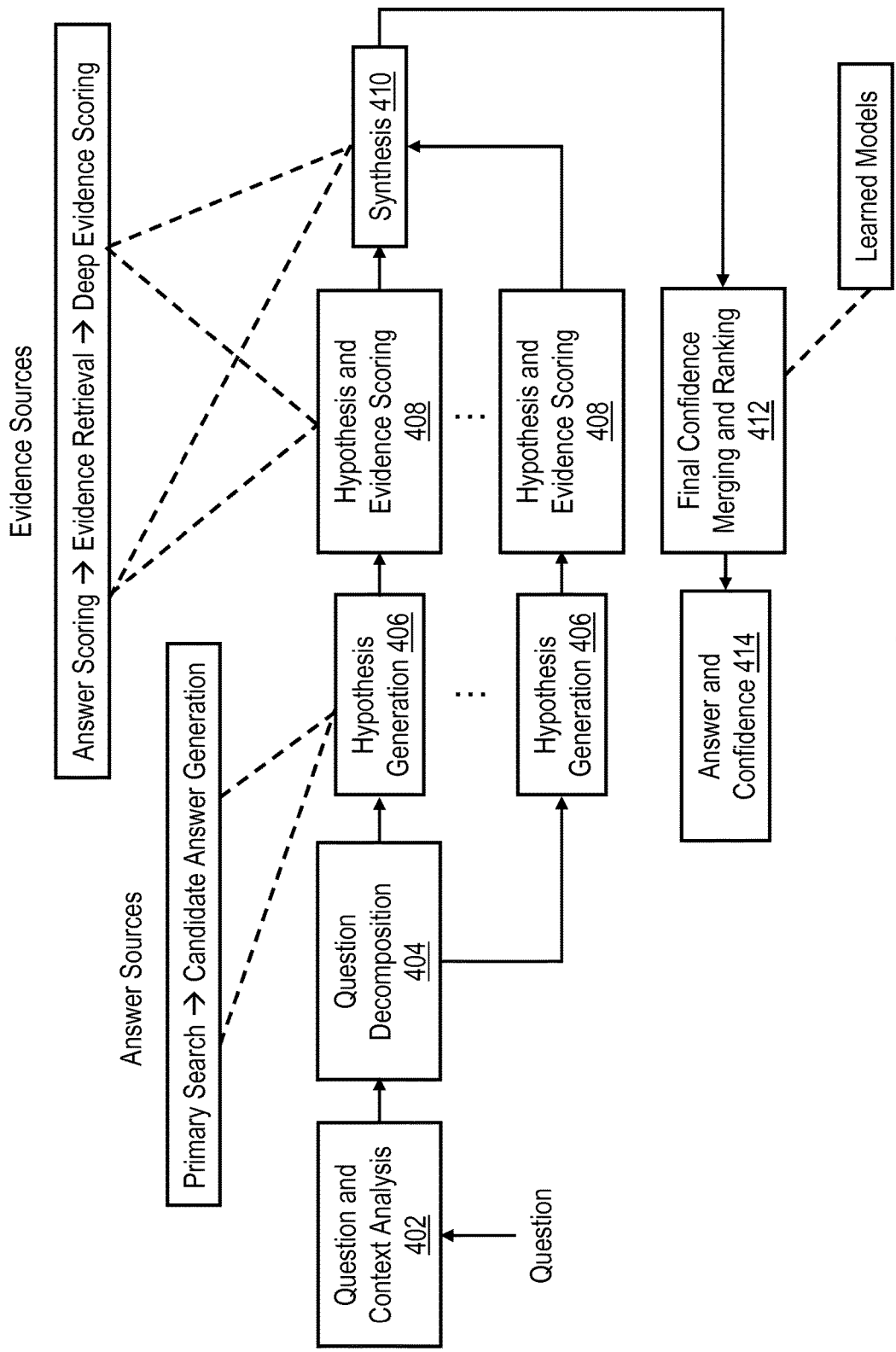
FIG. 4 depicts relevant components of the exemplary QA system pipeline of FIG. 3 in additional detail.

FIG. 4 illustrates relevant components of an exemplary QA system pipeline in additional detail. As is illustrated, question and analysis context block 402 receives a question in a natural language. An output of block 402 is provided to a question decomposition block 404, which further analyzes the different textual, grammatical, linguistic, punctuation and/or other components of the question. Block 404 provides inputs to multiple hypothesis generation blocks 406, which perform parallel hypothesis generation. Hypothesis generation blocks 406 each perform a primary search, collect reference data from different structured and unstructured sources, and generate candidate answers. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a QA system may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The QA system may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the QA system is further configured to score all the candidate answers using hypothesis and evidence scoring techniques (e.g., providing 'M' scores for 'M' candidate answers). In synthesis block 410 the QA system evaluates the candidate answers with the highest scores and determines which hypotheses generated the highest scores.

Following block 410, the QA system initiates final confidence merging and ranking in block 412. Finally, in block 412, the QA system provides an answer (and may provide a confidence score) to the question. Assuming, for example, the candidate answers 'j', 'k', and 'l' have the highest scores, a determination may then be made as to which of the hypotheses generated the best candidate answers. As one example, assume that hypotheses 'c' and 'd' generated the best candidate answers 'j', 'k', and 'l'. The QA system may then upload additional data required by hypotheses 'c' and 'd' into the cache and unload data used by other hypotheses from the cache. According to the present disclosure, the priority of what data is uploaded is relative to candidate scores (as such, hypotheses producing lower scores have less associated data in cache). When a new question is received, the above-described process is repeated. If the hypotheses 'c' and 'd' again produce best candidate answers, the QA system loads more data that is relevant to the hypotheses 'c' and 'd' into the cache and unloads other data.

If, on the other hand, hypotheses 'h' and 'g' produce the best candidate answers to the new question, the QA system loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that answer and evidence scoring indicates is most useful. The disclosed process may be unique to a QA system when a cache controller is coupled directly to an answer and evidence scoring mechanism of a QA system.

Figure 5:
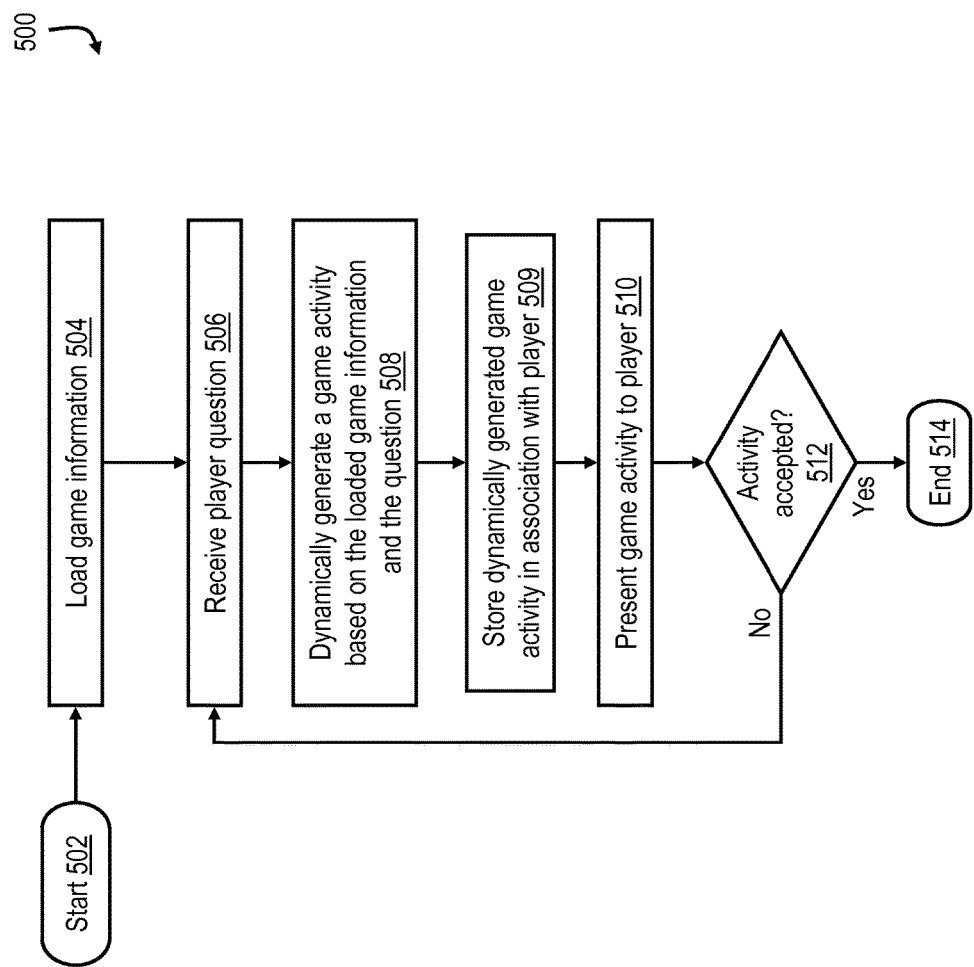
FIG. 5 is a flowchart of an exemplary process for creating dynamic game activities for games, according to one aspect of the present disclosure.

With reference to FIG. 5 a process 500 for dynamically generating content for a role-playing game using a question answering system, according to an embodiment of the present disclosure, is illustrated. It should be appreciated that process 500 may be generalized to virtually any online game. Process 500 may be implemented, for example, through the execution of one or more program modules (that are configured to function as a dynamic game activity generation engine) by one or more processors 204 of data processing system 200.

Process 500 may, for example, be initiated in block 502 in response to a player initiating game play via data processing system 200. Next, in block 504, data processing system 200 loads game information into its memory system (e.g., L2 cache 206). Then, in block 506, data processing system 200 receives a player question. It should be appreciated that a question may be directed to virtually any aspect of a game (e.g., who, what, when, where, why and/or how). Next, in block 508, data processing system 200 dynamically generates a game activity based on the loaded game information and the received question (or more broadly context data). In one or more embodiments, dynamic game activity generation may include: parsing and annotating entities in text; associating entities to each other through deep semantic relationships; and associating game information with the entities to facilitate using the entities as evidence or candidate answers in a question answering system.

In various embodiments, entities may include: characters associated with a client; NPCs; places (derived both from context data and game information text); and relationships derived from semantic relationships in the game information text and the context data. Game information includes activities that can be derived from the entities. For example, data processing system 200 may score candidate answers generated from hypotheses associated with the received question, as described above with reference to FIGS. 3-4, to determine what answer to utilize in generating dynamic game activities for the player. It should be appreciated that one or more candidate answers may be generated for each of the hypotheses, based on the evidence loaded into L2 cache 206.

Next, in block 509, activity data created for a game system may be stored in a database and associated with a client. Then, in block 510, data processing system 200 presents the game activity to the player. For example, the game activity may correspond to a quest. As one example, if the player question was "How do I get to location 'A'?" the quest may provide instructions, based on a highest scored answer, on how to get to location 'A' and direct the player to go to location "A" and retrieve an object 'B' and take the object 'B' to location 'C' based on the loaded game information and the question. As another example, if the player question was "Where is the dragon?" the quest may provide instructions, based on a highest scored answer, on how to get to location 'A' where the dragon is currently located and direct the player to go to location "A" and slay the dragon based on the loaded game information and the question.

Next, in decision block 512, data processing system 200 determines whether the player has accepted the presented game activity. In response to the player not accepting the game activity (e.g., as indicated by the player not beginning the quest within a predetermined time), control transfers from block 512 to block 506. In response to the player accepting the game activity (e.g., as indicated by the player beginning the quest within a predetermined time) in block 512, control transfers from block 512 to block 514, where process 500 terminates until the player, for example, completes a current quest and re-initiates game play.

Figure 6:
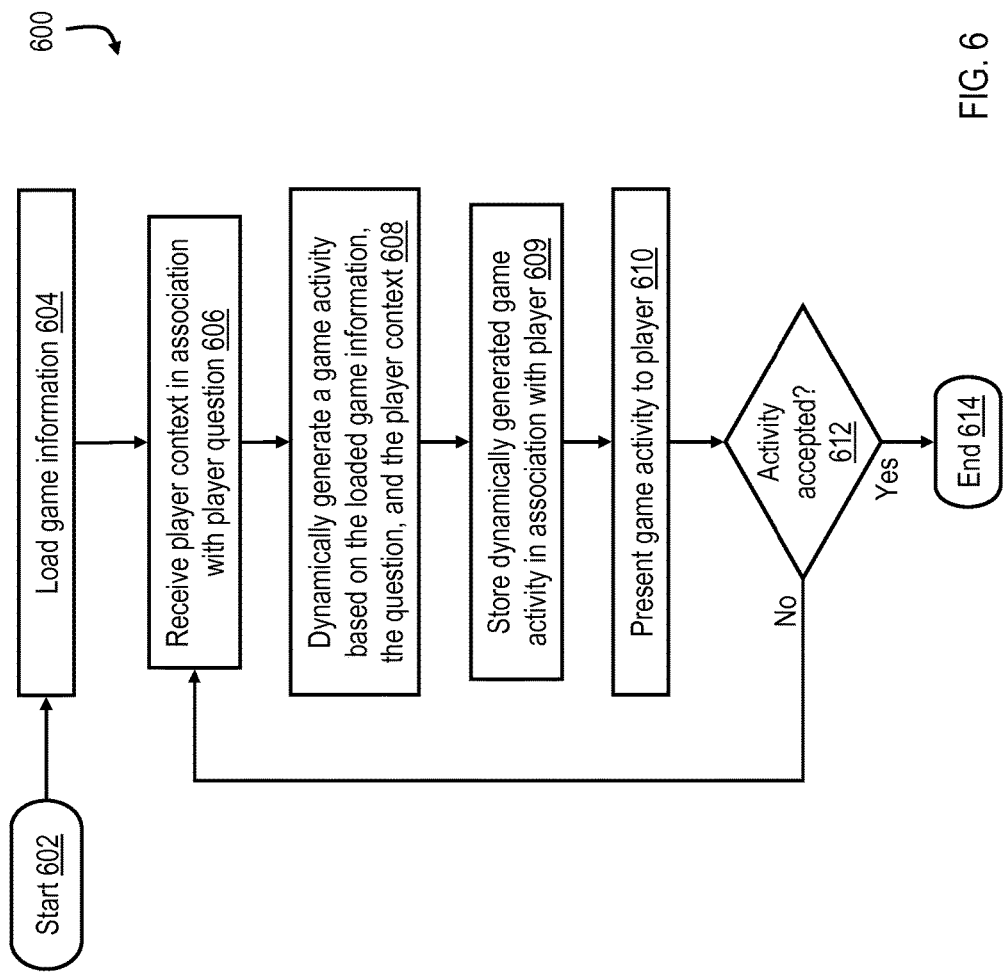
FIG. 6 is a flowchart of another exemplary process for creating dynamic game activities for games, according to another aspect of the present disclosure.

With reference to FIG. 6 a process 600 for dynamically generating content for a role-playing game using a question answering system, according to other aspects of the present disclosure, is illustrated. It should be appreciated that process 600 may be generalized to virtually any online game. Process 600 may be implemented, for example, through the execution of one or more program modules (that are configured to function as a dynamic game activity generation engine) by one or more processors 204 of data processing system 200.

Process 600 may, for example, be initiated in block 602 in response to a player initiating game play via data processing system 200. As above, a question (or more broadly context data) may be directed to virtually any aspect of a game (e.g., who, what, when, where, why and/or how). Next, in block

604, data processing system 200 loads game information into its memory system (e.g., L2 cache 206). Then, in block 606, data processing system 200 receives a player question and a player context in association with the player question. For example, the player context may correspond to a current player level and/or a character assigned to the player. Additionally, player context data can be the location of the character, the location of the actual user of the character, the current game state, and/or the current character interactions with NPCs and their environment. Next, in block 608, data processing system 200 dynamically generates a game activity based on the loaded game information, the received question, and the player context.

In one or more embodiments, the dynamic game activity generation may include: parsing and annotating entities in text; associating entities to each other through deep semantic relationships; and associating game information with the entities to facilitate using the entities as evidence or candidate answers in a question/answer system. As above, entities may, for example, include: characters associated with a client; NPCs; places (derived both from context data and game information text); and relationships derived from semantic relationships in the game information text and the context data. Game information includes activities that can be derived from the entities. For example, data processing system 200 may score candidate answers generated from hypotheses associated with the received question, as described above with reference to FIGS. 3-4, to determine what answer to utilize in generating dynamic game activity for the player. It should be appreciated that one or more candidate answers may be generated for each of the hypotheses, based on the evidence loaded into L2 cache 206.

Next, in block 609, activity data created for a game system may be stored in a database and associated with a client. Then, in block 610, data processing system 200 presents, e.g., via a web browser, the game activity to the player. For example, the game activity may correspond to text or a quest. For example, if the player question was "How do I get to location 'G'?" a quest may provide instructions, based on a highest scored answer, on how to get to location 'G' and direct the player to go to location "G" and engage an object 'H' (e.g., a wizard) in combat based on the loaded game information, the received question, and the player context. As another example, if the player question was "Where is the princess?" the quest may provide instructions, based on a highest scored answer, on how to get to location 'J' where the princess is being held against her will and direct the player to go to location "J" and rescue the princess based on the loaded game information, the received question, and the player context.

Next, in decision block 612, data processing system 200 determines whether the player has accepted the presented game activity. In response to the player not accepting the game activity (e.g., as indicated by the player not beginning the quest within a predetermined time), control transfers from block 612 to block 606. In response to the player accepting the game activity (e.g., as indicated by the player beginning the quest within a predetermined time) in block 612, control transfers from block 612 to block 614, where process 600 terminates until the player, for example, completes a current quest and re-initiates game play.

Accordingly, techniques have been disclosed herein that advantageously dynamically generate content for a game, e.g., a role-playing game, in order to make the game more engaging.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer program product configured to dynamically generate game activities for a role-playing game, the computer program product comprising:
   a computer-readable storage device; and
   computer-readable program code embodied on the computer-readable storage device, wherein the computer-readable program code, when executed by a data processing system, causes the data processing system to:
      load game information about a role-playing game;
      receive a question from a player of the role-playing game;
      in response to receiving the question, dynamically generate a game activity based on the question and the game information, wherein the game activity corresponds to a quest that is different from canned quests that are initially built into the role-playing game by a game designer; and
      present the game activity to the player.

2. The computer program product of claim 1, wherein the computer-readable program code, when executed by the data processing system, is further configured to:
   receive a player context for the player in the role-playing game; and
   in response to the player context changing, adjust the game activity based on the changed player context.

3. The computer program product of claim 2, wherein the data processing system is a question answering system and the computer-readable program code, when executed by the question answering system, further configures the question answering system to:
   identify one or more characters, one or more locations, and the quest based on one or more answers generated by the question answering system in response to receiving the question from the player; and present the quest to the player.

4. The computer program product of claim 2, wherein the data processing system employs natural language processing and deep semantic processing on the game information to determine and generate the game activity in view of the player context.

5. The computer program product of claim 1, wherein the game information comprises one or more of literature, models, rules, locations, and maps for the role-playing game.

6. The computer program product of claim 1, wherein the received question asks at least one of who, what, when, where, and why about the game information and is used to determine a context of the player in the game.

7. The computer program product of claim 1, wherein the role-playing game is a massive multiplayer online role-playing game.

8. A data processing system, comprising:
   a cache memory; and
   a processor coupled to the cache memory, wherein the processor is configured to:
      load game information about a role-playing game;
      receive a question from a player of the role-playing game;
      in response to receiving the question, dynamically generate a game activity based on the question and the game information, wherein the game activity corresponds to a quest that is different from canned quests that are initially built into the role-playing game by a game designer; and
      present the game activity to the player.

* * * * *